(12) United States Patent
Lu et al.

(10) Patent No.: US 7,814,275 B2
(45) Date of Patent: Oct. 12, 2010

(54) APPARATUS AND METHOD FOR PERFORMING A PLURALITY OF STORAGE DEVICES

(75) Inventors: Xin Lu, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 517 days.

(21) Appl. No.: 11/952,141

(22) Filed: Dec. 7, 2007

(65) Prior Publication Data

US 2008/0140928 A1 Jun. 12, 2008

(30) Foreign Application Priority Data

Dec. 8, 2006 (CN) .......................... 2006 1 0201262

(51) Int. Cl.
*G06F 12/00* (2006.01)
(52) U.S. Cl. ............... 711/114; 711/112; 711/E12.001; 710/13
(58) Field of Classification Search ...................... None
See application file for complete search history.

(56) References Cited

U.S. PATENT DOCUMENTS

| | | | |
|---|---|---|---|
| 5,903,913 A * | 5/1999 | Ofer et al. ................... | 711/156 |
| 6,915,524 B2 | 7/2005 | Crowley et al. | |
| 7,051,101 B1 * | 5/2006 | Dubrovsky et al. ......... | 709/225 |
| 2002/0091898 A1 * | 7/2002 | Matsunami et al. ......... | 711/114 |
| 2004/0049572 A1 * | 3/2004 | Yamamoto et al. .......... | 709/224 |
| 2007/0061510 A1 * | 3/2007 | Kumagai et al. ............ | 711/112 |

* cited by examiner

*Primary Examiner*—Matt Kim
*Assistant Examiner*—John P Fishburn
(74) *Attorney, Agent, or Firm*—Frank R. Niranjan

(57) ABSTRACT

A storage device batch and parallel processing method adapted for an electronic apparatus, including: (a) connecting a plurality of storage devices to the electronic apparatus; (b) logging device identifiers and disk identifiers of the connected storage devices respectively into a device identifier table and a disk identifier table; (c) obtaining the device identifiers of a predetermined number of the storage devices from the device identifier table and generating a disk table to store the device identifiers of the predetermined number of storage devices; (d) obtaining disk identifiers of the predetermined number of storage devices and recording the disk identifiers to the disk table according to a logging time of each storage device of the predetermined number of storage devices; (e) controlling the storage devices recorded in the disk table performing a data transfer and recursively repeating (c) to (e) until detecting connections between all the storage devices and the electronic apparatus are cutoff.

7 Claims, 5 Drawing Sheets

First Disk Table — 33

| Device Identifier | Disk Identifier | Current State |
|---|---|---|
| 1 | a | Connecting |
| 2 | b | Connected |
| ⋮ | ⋮ | ⋮ |

Second Disk Table — 34

| Device Identifier | Disk Identifier | Current State |
|---|---|---|
| 11 | m | Connecting |
| 12 | n | Connecting |
| ⋮ | ⋮ | ⋮ |

FIG. 2

APPARATUS AND METHOD FOR PERFORMING A PLURALITY OF STORAGE DEVICES

BACKGROUND OF THE INVENTION

1. Field of the Invention

The present invention relates generally to an apparatus and a method for performing a plurality of storage devices.

2. Description of Related Art

When a portable storage device, such as a hard disk drive, is connected to an electronic apparatus, such as a computer, a device identifier and a disk identifier of the storage device will be logged in the electronic apparatus. The device identifier is used for identifying the storage device. The disk identifier is used for identifying the physical disk of the storage device such as "disk E", "disk F". Generally, the device identifier can be logged in the electronic apparatus immediately, but due to initialization of the physical disk of the storage device, it takes a longer time to log the disk identifier in the electronic apparatus.

Sometimes, the electronic apparatus performs the same operation on a plurality of storage devices simultaneously, such as burns an initial procedure to a plurality of storage devices. Generally, when simultaneously performing the same operation on many storage devices, the devices identifier and the disk identifiers of all the storage devices are logged in the electronic apparatus simultaneously. Because it takes a long time to log the device identifier and the disk identifiers of all the storage devices, this method is inefficient.

What is needed is an electronic apparatus and method for operating a plurality of storage devices, which can improve operation efficient when the electronic apparatus performs the same operation on the plurality of storage devices simultaneously.

SUMMARY OF THE INVENTION

A storage device batch and parallel processing method adapted for an electronic apparatus, including: (a) connecting a plurality of storage devices to the electronic apparatus; (b) logging device identifiers and disk identifiers of the connected storage devices respectively into a device identifier table and a disk identifier table; (c) obtaining the device identifiers of a predetermined number of the storage devices from the device identifier table and generating a disk table to store the device identifiers of the predetermined number of storage devices; (d) obtaining disk identifiers of the predetermined number of storage devices and recording the disk identifiers to the disk table according to a logging time of each storage device of the predetermined number of storage devices; (e) controlling the storage devices recorded in the disk table, performing data transfer, and recursively repeating (c) to (e) until any of the detected connections, between all the storage devices and the electronic apparatus, are disconnected.

Other novel features and advantages will be drawn from the following detailed description of preferred and exemplary embodiments with reference to the attached drawings, in which:

BRIEF DESCRIPTION OF THE DRAWINGS

The components in the drawings are not necessarily drawn to scale, the emphasis instead being placed upon clearly illustrating the principles of the communication device. Moreover, in the drawings, like reference numerals designate corresponding parts throughout the several views.

FIG. 2 is a diagram of the disk tables.

DETAILED DESCRIPTION OF THE INVENTION

Figure 1:
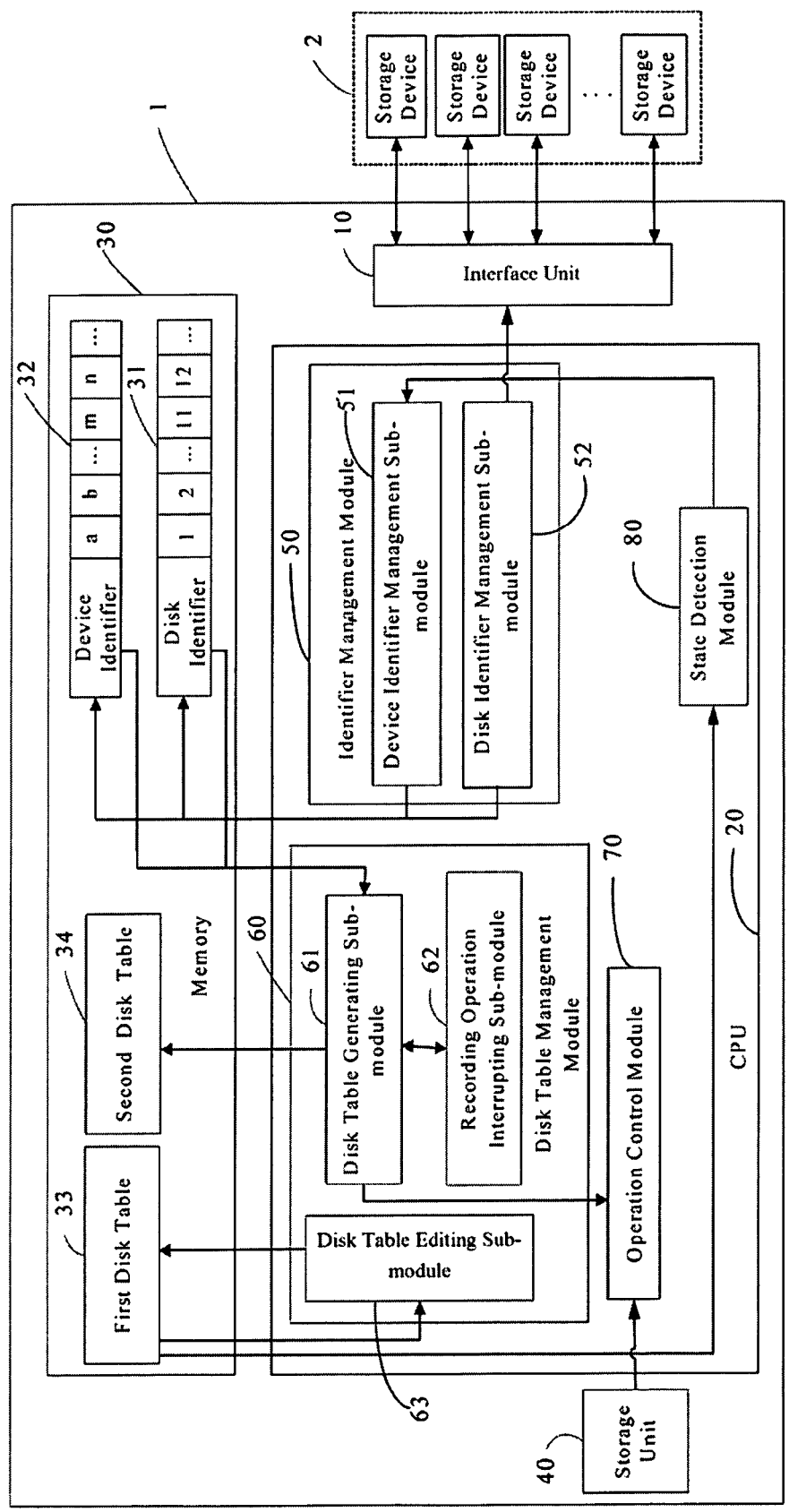
FIG. 1 is a block diagram of a hardware infrastructure of an electronic apparatus for operating a plurality of storage devices in accordance with a preferred embodiment of the present invention.

FIG. 1 is a block diagram of a hardware infrastructure of an electronic apparatus for operating a plurality of storage devices in accordance with a preferred embodiment of the present invention. The electronic apparatus 1 includes an interface unit 10, a central processing unit (CPU) 20, a memory 30, and a storage unit 40. The interface unit 10 is used for connecting a plurality of storage devices 2. The interface unit 10 can be a universal serial bus (USB), a 1394 interface, or other like interfaces. The CPU 20 includes an identifier management module 50, a disk table management module 60, an operation control module 70, and a status detection module 80.

The identifier management module 50 includes a device identifier management sub-module 51 and a disk identifier management sub-module 52. Once any storage devices 2 is attached/coupled to the electronic apparatus 1, the device identifier management sub-module 51 reads a device identifier of the storage device 2 and logs the device identifier in a device identifier table 31 in the memory 30, and the disk identifier management sub-module 52 reads a disk identifier of the storage device 2 and logs the disk identifier into a disk identifier table 32 in the memory 30.

The disk table management module 60 includes a disk table generating sub-module 61, a disk table editing sub-module 62, and a record operation interrupting sub-module 63. The disk table generating sub-module 61 obtains the device identifiers of a predetermined number of the plurality of storage devices 2 from the device identifier table 31 and begins generating a disk table such as a first disk table 33 shown in FIG. 2.

A schematic diagram of the first disk table 33 is shown in FIG. 2. The first disk table 33 includes a device identifier column, a disk identifier column, and a current status column respectively. In other words, each disk record in the first disk table 33 consists of a device identifier value, a disk identifier value, and a current status value corresponding one of the storage devices 2. The device identifier column is used for recording the device identifier values of the storage devices 2 obtained from the device identifier table 31. The disk identifier column is used for recording the disk identifier values of the storage devices 2. The current status column is for recording current status values of the storage devices 2. In this preferred embodiment, the current status value of one of the storage devices 2 may be a connecting status, a connected status, and a disconnected status. The connecting status is a status where the storage device 2 has been attached to the electronic apparatus 1, but the electronic apparatus 1 has not yet recognized the disk identifier of the storage device 2. The connected status is a status where the electronic apparatus 1 has recognized the disk identifier of the storage device 2 attached and can perform data transfers with the storage device 2. The disconnected status is a status where the storage device 2 is detached from the electronic apparatus 1. The disconnect operation may be a manual operation or an electronic operation which detaches the storage device 2 from the electronic apparatus 1 when the data transfers with the storage device 2 has been completed.

When the device identifiers of the predetermined number of the plurality of storage devices 2 are recorded in the first disk table 33, the disk table generating sub-module 61 records the disk identifiers into the disk identifier value, and records the value of "connecting" as the current status value of the disk status of each of the predetermined number of storage devices 2. The disk status of each of the predetermined number of the storage devices 2 are added to the first disk table 33 in a predetermined order according to a login time of each of the disk identifier of the predetermined number of storage devices 2. When all the disk identifiers and current status of the predetermined number of the storage devices 2 are added into the first disk table 33, the generation of the first disk table 33 is completed.

When all the device identifiers of the predetermined number of the storage devices 2 are recorded into the first disk table 33, the record operation interrupting sub-module 63 generates an interrupt flag to interrupt the disk table generating sub-module 61 to generate the second disk table 34 of the remaining number of the plurality of the storage devices 2. The second disk table 34 has the same table structure as the first disk table 33 as shown in FIG. 2. When the first disk table 33 is generated, the record operation interrupt sub-module 63 cancels the interrupt flag to enable the disk table generating sub-module 61 to start to generate the second disk table 34.

When the first disk table 33 is generated, the disk table generating sub-module 61 further sends a completion signal to the operation control module 70 to inform the operation control module 70 that the predetermined number of the storage devices 2 are available to perform data transfers. The data transfer can be copying data from or writing data to the storage unit 40 into the storage devices 2.

The disk table editing sub-module 62 is for updating the current status of the predetermined number of the storage devices 2 recorded in the first disk table when the current status of any of the predetermined number of the storage devices 2 has been changed. For example, once the disk identifier management sub-module 51 recognizes the disk identifier of a particular storage device 2, the disk table editing sub-module 62 updates the status in the current status value of the disk status of the particular storage device 2 in the first disk table 33 to "connected". If detects that the storage device 2 is detached from the electronic device via the disconnect operation, the disk table editing sub-module 62 updates the current status in the current status column of the first disk table 33 as "disconnected".

If the status detection module 80 detects that the current status of all of the predetermined number of the storage devices 2 are the "disconnected", the status detection module 80 deletes the first disk table 33.

Figure 3:
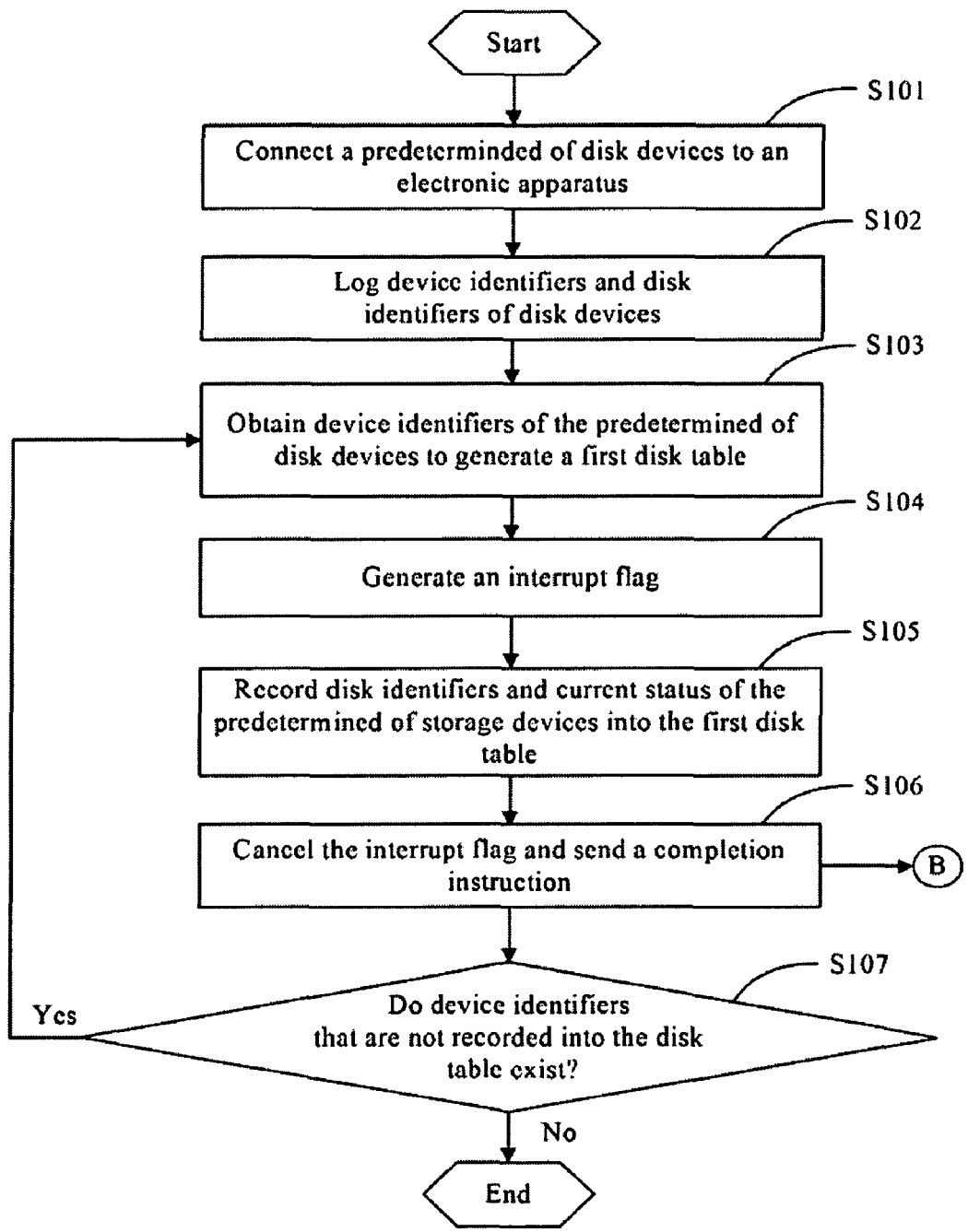
FIG. 3 is a flow chart of a preferred method of generating the disk table in accordance with the preferred embodiment of the present invention.

FIG. 3 is a flow chart of a preferred method of generating the disk table in accordance with the preferred embodiment of the present invention.

In step S101, a plurality of storage devices 2 are connected to the electronic apparatus 1.

In step S102, the device identifier management sub-module 51 reads the device identifiers of the storage devices 2 and logs the device identifiers into the device identifier table 31, and the disk identifier management sub-module 52 reads the disk identifiers of the storage devices 2 and logs the disk identifiers into the disk identifier table 32.

In step S103, the disk table generating sub-module 61 obtains the device identifiers of the predetermined number of the storage devices 2 from the device identifier table 31 and generates the first disk table 33 to record the device identifiers.

In step S104, the record operation interrupting sub-module 63 generates the interrupt flag to interrupt the disk table generating sub-module 61 to generate the second disk table 34.

In step S105, the disk table generating sub-module 61 records the disk identifiers into the disk identifier value and records "connecting" into the current status value of the disk record of each of the predetermined number of storage devices 2, and the disk record of each of the predetermined number of the storage devices 2 are added to the first disk table 33 in a predetermined order according to a login time of each of the disk identifier of the predetermined number of storage devices 2.

In step S106, the disk table generating sub-module 61 sends the completion instruction to the operation control module 70 to start a procedure B described latter.

In step S107, the disk table generating sub-module 61 determines whether there are device identifiers in the device identifier table 31 that are not recorded into the disk table. If there are device identifiers that are not recorded into the disk table, the procedure goes to the step S103. If there are not device identifiers that are not recorded into the disk table, the procedure is ended.

Figure 4:
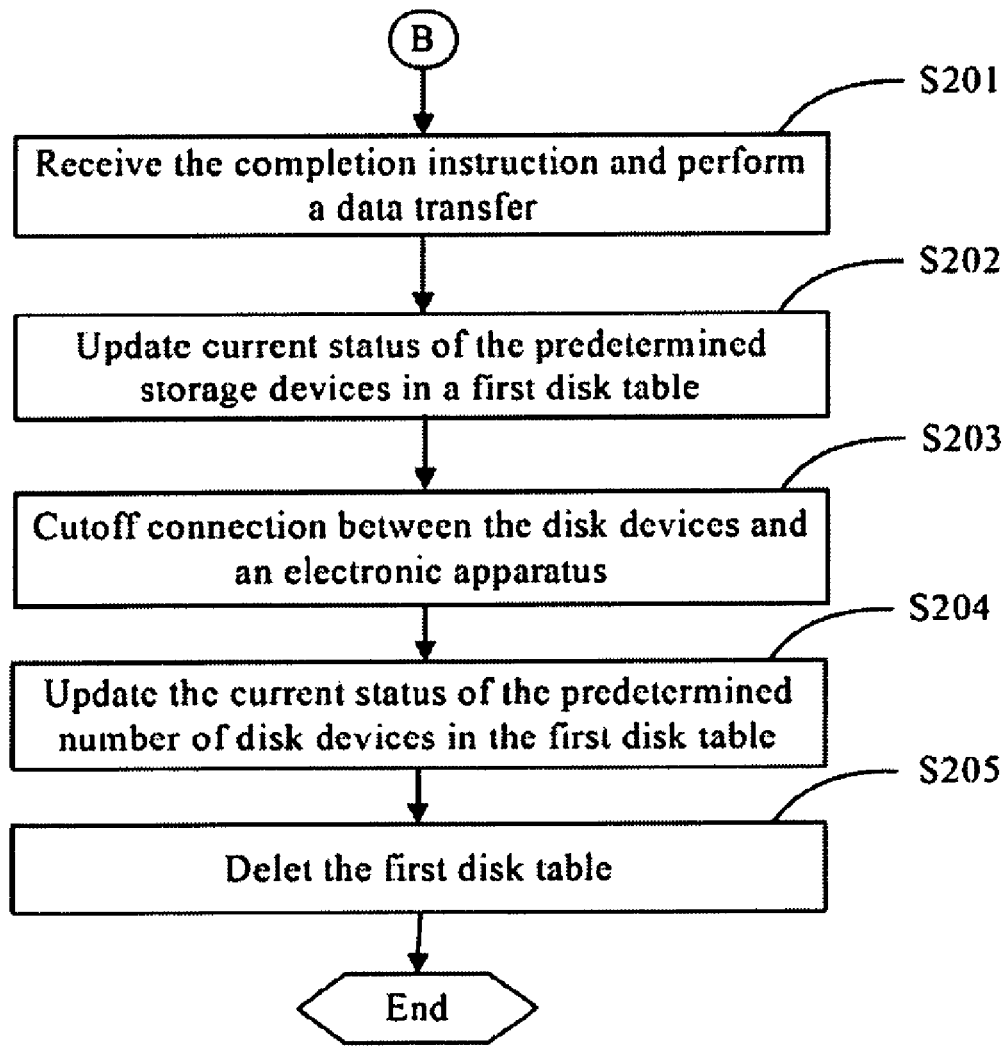
FIG. 4 is a preferred method of operating the storage device.

FIG. 4 is a flow chart describing the procedure B of FIG. 3, namely a preferred method of operating the storage device 2. In step S201, the operation control module 70 receives the completion instruction and operates the predetermined number of the storage devices 2 recorded in the first disk table 33 to perform the data transfer.

In step S202, the disk table editing sub-module 62 updates the current status value in the current status column of the first disk table 33 from "connecting" to "connected".

In step S203, when the connection between the electronic apparatus and the storage device is cut off, the disk table editing sub-module 62 updates the current status value in the current status column of the first disk table 33 from "connected" to "disconnected".

In step S204, if the status detection module 80 detects that the current status value of the predetermined number of the storage devices 2 in the current status column are "disconnected", the status detection module 80 deletes the first disk table 33.

Figure 5:
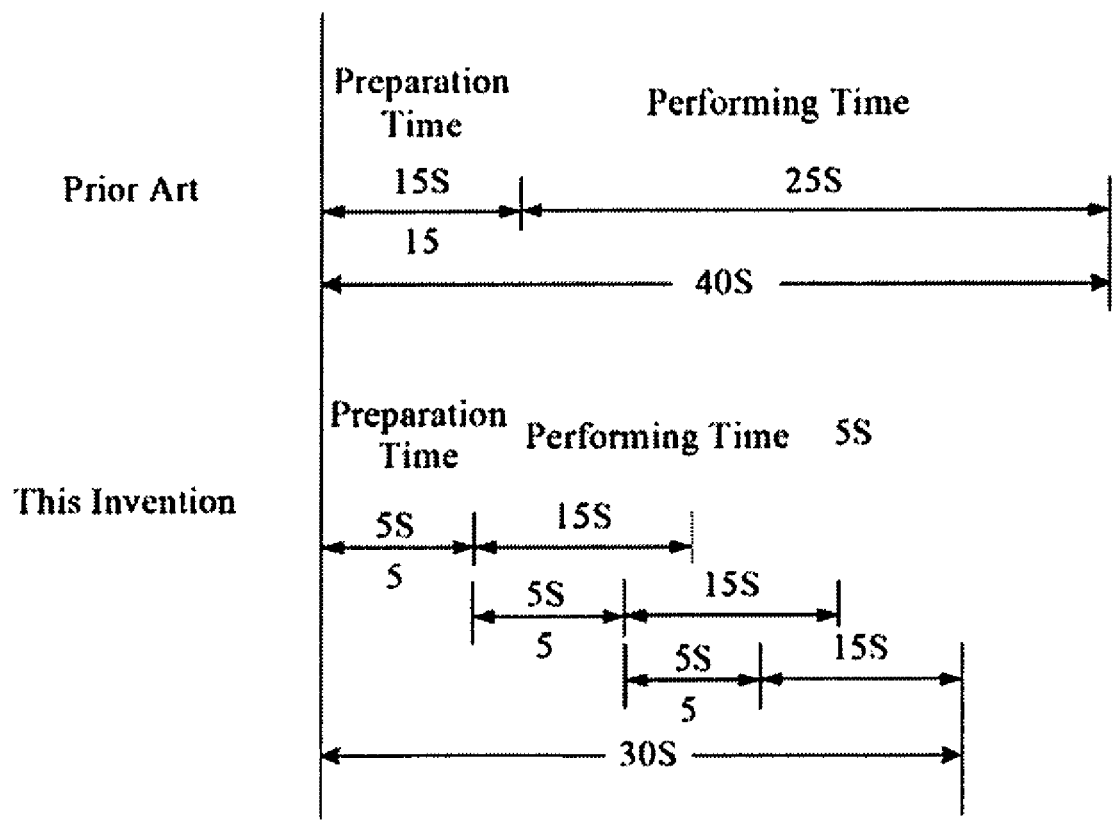
FIG. 5 shows the speed advantage, over the prior art, of the present invention.

FIG. 5 shows the speed advantage, over the prior art, of the present invention. Suppose 15 storage devices 2 are connected to the electronic apparatus and a preparation time for connecting and recognizing each storage device 2 is 1 second. In the prior art, suppose 25 seconds are needed to operate the data transfer on the 15 storage devices. Therefore, 40 seconds are needed to finish all the operations on the 15 storage devices 2. In the preferred embodiment of this invention, the predetermined number of the storage device is 5. Because of the limited processing speed of the CPU 20, the time for operating 5 storage devices simultaneously is shorter than operating 15 storage devices 2 simultaneously. Suppose 15 seconds are needed to perform the data transfer on the 5 storage devices 2, thus 30 seconds are needed to finish all the data transfer on the 15 storage devices 2. Therefore, 10 seconds are saved.

Although the present invention has been specifically described on the basis of preferred and exemplary embodiments, the invention is not to be construed as being limited thereto. Various changes or modifications may be made to the embodiments without departing from the scope and spirit of the invention as recited in the claims and equivalents thereof.

What is claimed is:

1. An electronic apparatus, capable of performing batch and parallel processing of a plurality of storage devices, comprising:
   an interface for connecting the storage devices;
   a memory for storing a device identifier table and a disk identifier table, wherein the device identifier table and the disk identifier table are respectively configured for recording device identifiers and disk identifiers of the connected storage devices when the storage devices are connected to the interface; and
   a central processing unit (CPU) comprising:
   an identifier management module for logging the device identifiers and the disk identifiers of the connected storage devices respectively into the device identifier table and the disk identifier table; a disk table management module comprising:
   a disk table generating sub-module for obtaining the device identifiers of a predetermined number of the storage devices from the device identifier table and generating a disk table to record the obtained device identifiers, recording the disk identifiers of the predetermined number of the storage devices into the disk table in turn according to a logging time of each of the predetermined number of the storage devices, and for generating a completion signal when the disk identifiers of the predetermined number of the storage devices are recorded to the disk table; and
   an operation control module for receiving the completion signal and controlling the predetermined number of the storage devices to perform a data transfer,
   wherein the disk table is additionally used for recording current status of the predetermined number of the storage devices, and the disk table management module further comprises a disk table editing sub-module for updating the current status recorded in the disk table when the current status of the predetermined number of the storage devices are changed.

2. The apparatus as described in claim 1, wherein the current status of the predetermined number of the storage devices comprise a connecting status, a connected status, and a disconnected status, wherein the connecting status is a status where the storage device has been connected to the electronic apparatus but the electronic apparatus has not recognized the disk identifier of the storage device, the connected status is a status where the electronic apparatus has recognized the disk identifier of the storage device and can operate the storage device, and the disconnected status is a status where the electronic apparatus and the storage device is disconnected.

3. The apparatus as described in claim 2, wherein the CPU further comprises a status detection module for deleting the disk table when detecting that the current status, as recorded in the disk table, are disconnected status.

4. The apparatus as described in claim 2, wherein the disk table management module further comprises a record operation interrupting sub-module for generating an interrupt flag to prevent the disk table generating sub-module from generating a new disk table when the disk table finished recording the device identifiers of the predetermined number of the storage devices are recorded in the disk table, and for canceling the interrupt flag when the disk table is generated.

5. A batch and parallel processing method adapted for an electronic apparatus, comprising:
   (a) connecting a plurality of storage devices to the electronic apparatus;
   (b) logging device identifiers and disk identifiers of the connected storage devices respectively into a device identifier table and a disk identifier table;
   (c) obtaining the device identifiers of a predetermined number of the storage devices from the device identifier table and generating a disk table to store the device identifiers of the predetermined number of storage devices;
   (d) obtaining disk identifiers of the predetermined number of storage devices and recording the disk identifiers to the disk table according to a logging time of each storage device of the predetermined number of storage devices;
   (e) controlling the storage devices recorded in the disk table performing a data transfer and recursively repeating (c) to (e) until any of the detected connections between any of the storage devices and the electronic apparatus are disconnected,
   further comprising updating current status of the storage devices recorded in the disk table, the current status of the storage devices comprise a connecting status, a connected status, and a disconnected status, the connecting status is a status where the storage device has been connected to the electronic apparatus, but the electronic apparatus has not recognized the disk identifier of the storage device, the connected status is a status where the electronic apparatus has recognized the disk identifier of the storage device and can operate the storage device, the disconnected status is a status where the electronic apparatus and the storage device is disconnected.

6. The method as described in claim 5, further comprising deleting the disk table when detecting that the current status, as recorded in the disk table, are disconnected status.

7. The method as described in claim 5, further comprising
   generating an interrupt flag to prevent the disk table generating sub-module from generating a new disk table when the device identifiers of the predetermined number of storage devices are recorded in the disk table, and
   canceling the interrupt flag when the disk table is generated.

* * * * *